United States Patent [19]
Horiuchi

[11] Patent Number: 5,430,883
[45] Date of Patent: Jul. 4, 1995

[54] FUNCTION EXPANSION UNIT CAPABLE OF SUPPLYING POWER TO COMPUTER

[75] Inventor: Takayuki Horiuchi, Tokyo, Japan

[73] Assignee: Kabushiki Kaisha Toshiba, Kawasaki, Japan

[21] Appl. No.: 177,386

[22] Filed: Jan. 5, 1994

Related U.S. Application Data

[62] Division of Ser. No. 777,190, Oct. 16, 1991, Pat. No. 5,301,334.

[30] Foreign Application Priority Data

Oct. 19, 1990 [JP] Japan ................... 2-278903

[51] Int. Cl.⁶ .................................................. G06F 1/30
[52] U.S. Cl. ...................... 395/750; 364/707; 364/579; 371/66; 363/56; 363/101
[58] Field of Search ............ 395/750; 364/707, 579; 371/66; 363/56, 101

[56] References Cited

U.S. PATENT DOCUMENTS

| | | | |
|---|---|---|---|
| 4,246,635 | 1/1981 | Arima | 363/101 |
| 4,402,059 | 8/1983 | Kennon et al. | 395/750 |
| 4,560,936 | 12/1985 | Pelowski | 364/579 |
| 4,716,521 | 12/1987 | Nagae | 395/750 |
| 5,088,018 | 2/1992 | Lee | 363/56 |
| 5,179,710 | 1/1993 | Coschieri | 395/750 |

*Primary Examiner*—Allen R. MacDonald
*Assistant Examiner*—George Davis
*Attorney, Agent, or Firm*—Oblon, Spivak, McClelland, Maier & Neustadt

[57] ABSTRACT

A system includes a computer main body, and an expansion unit detachably connected to the computer main body, for supplying a power to the computer main body and expanding a function of the computer. A power in the expansion unit is consumed in the expansion unit prior to power supply to the computer main body so as to stably supply a power to circuit components of the expansion unit. The expansion unit includes an expansion connector to which at least one expansion board is arbitrarily detachably connected, a power supply for supplying the power to the circuit components including the expansion circuit boards and to the computer main body, and a switch for detecting a power supplied from the power supply to the circuit components and stopping power supply to the computer main body by the power supply when the power exceeds a predetermined value.

20 Claims, 9 Drawing Sheets

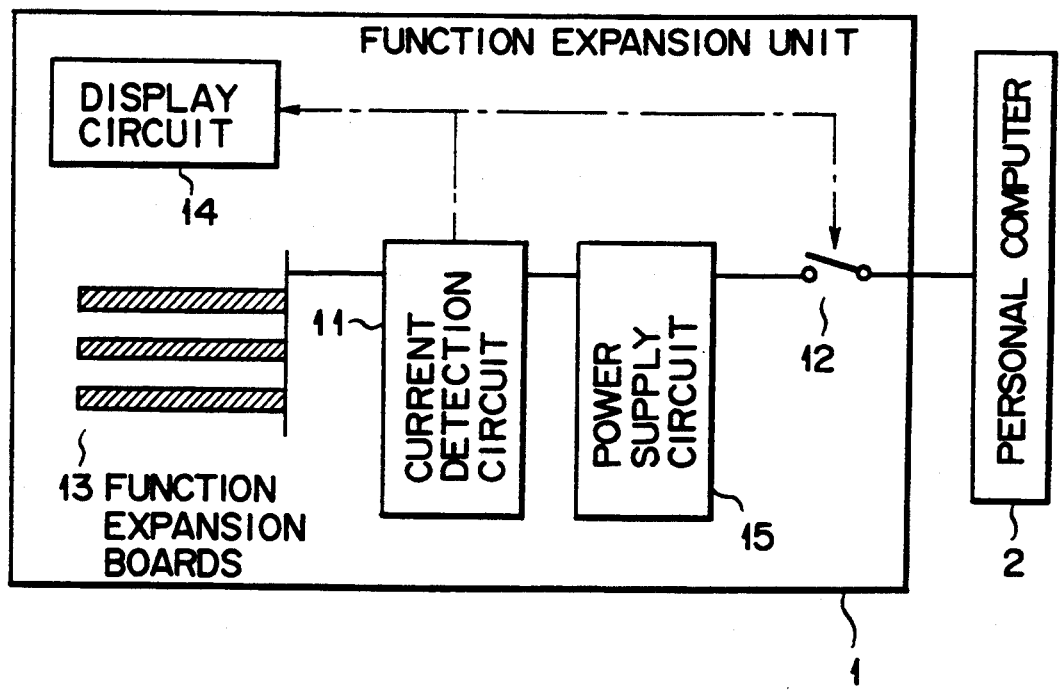
F I G. 1
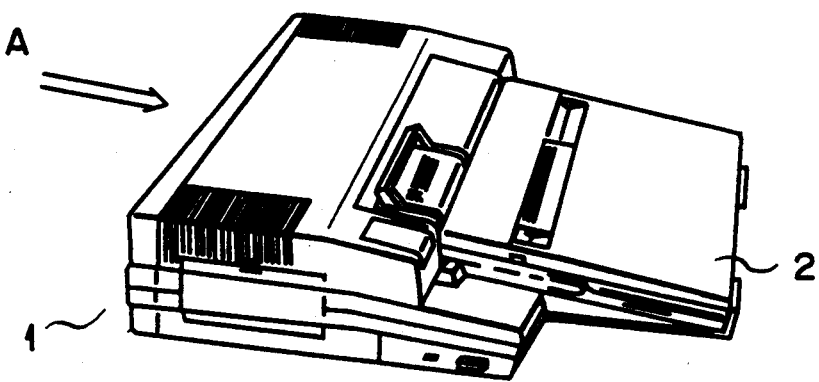
F I G. 2

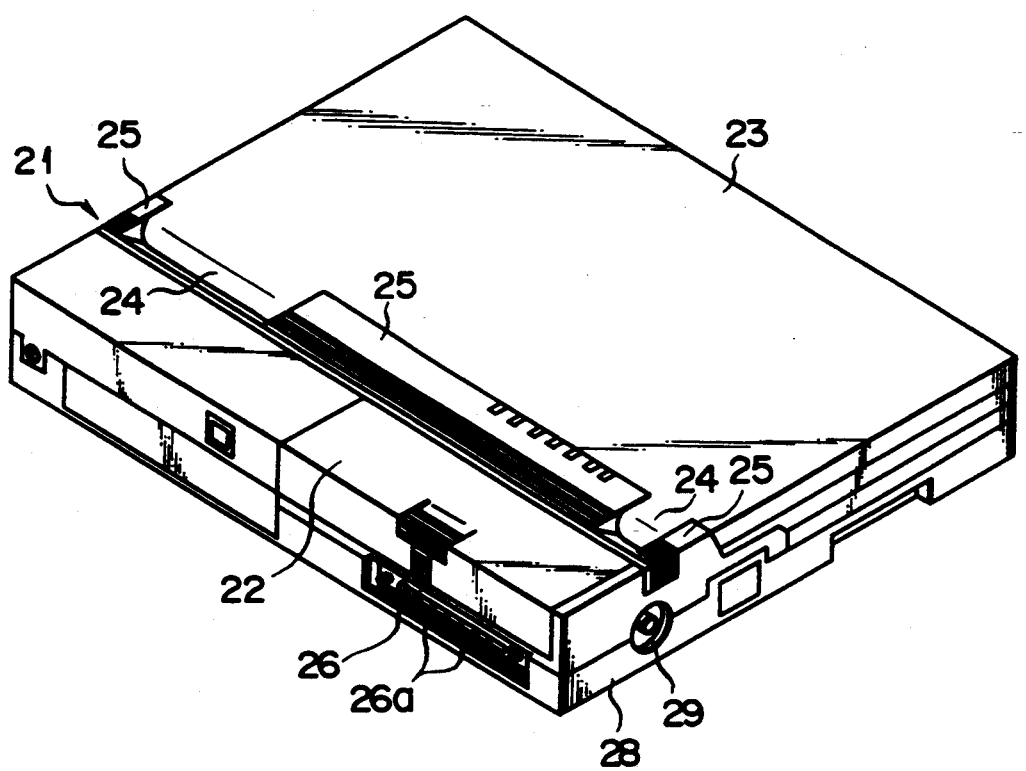
F I G. 3

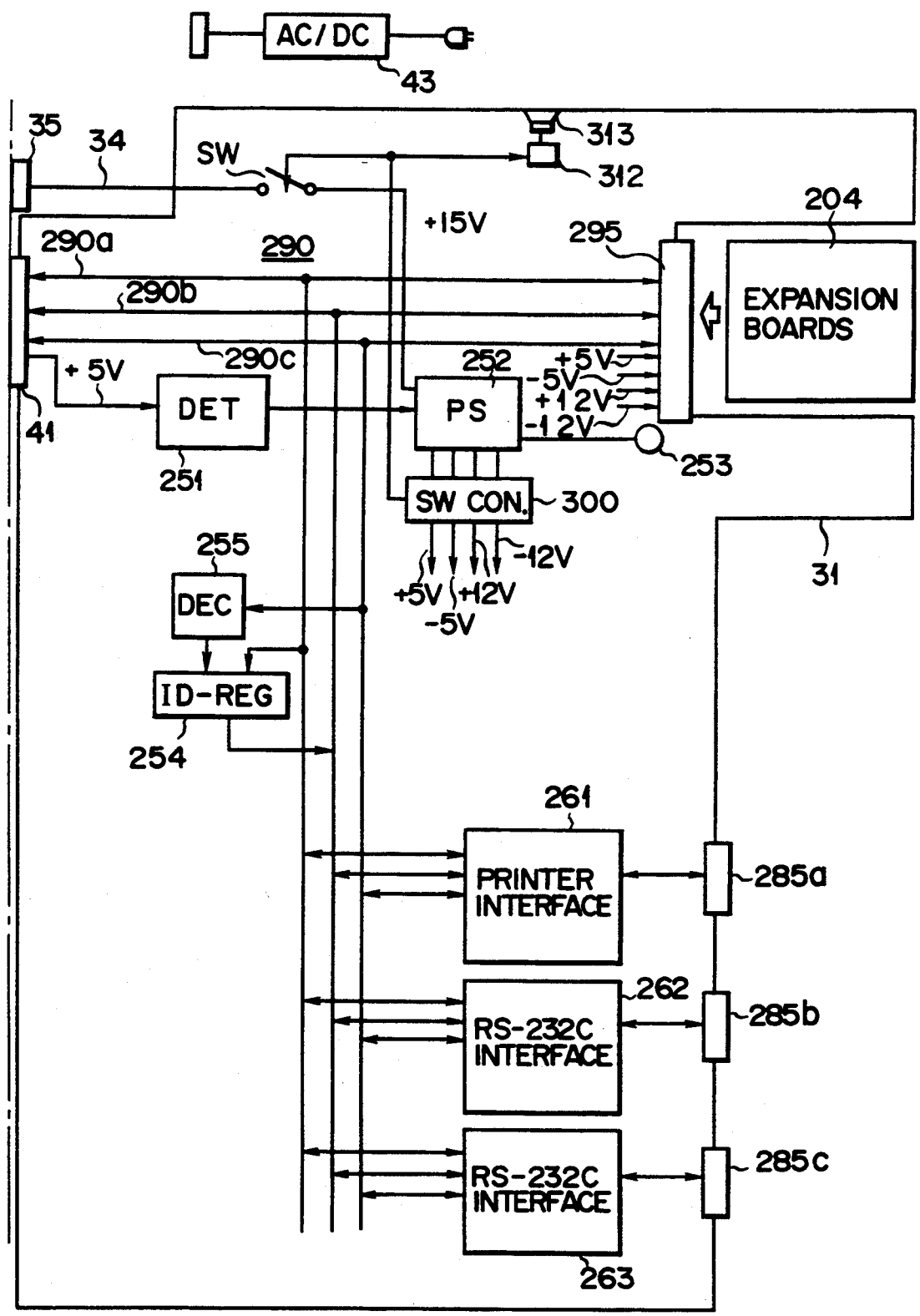
F I G. 6B

FUNCTION EXPANSION UNIT CAPABLE OF SUPPLYING POWER TO COMPUTER

This is a division of application Ser. No. 07/777,190, filed on Oct. 16, 1991, U.S. Pat. No. 5,301,334.

BACKGROUND OF THE INVENTION

1. Field of the Invention

The present invention relates to a function expansion unit preferably used in a portable computer and, more particularly, to a function expansion unit having a function of supplying a power to a computer.

2. Description of the Related Art

In a personal computer field, a laptop or book-type portable personal computer having a light weight and a small size has prevailed, and has been frequently used as a low-end machine. The laptop personal computer cannot support many functions as standard functions to maintain good portability of the computer. A high-grade function is generally presented as an optional function. More specifically, a high-grade function is presented as a function expansion card (to be referred to as only an expansion card or a circuit board hereinafter), and the expansion card is inserted into the vacant slot of a function expansion unit (to be referred to as only an expansion unit hereinafter) to be connected to the personal computer, thereby obtaining the high-grade function.

An expansion unit capable of supplying a power to a personal computer is disclosed in, for example, U.S. patent application Ser. No. 578,533 and European patent application 90117214.8. The contents of the U.S. and European patent applications are incorporated as a reference in this specification. Personal computers driven by a battery are generally used, and power supply from the expansion unit to the personal computer is performed in a DC manner.

However, when an expansion circuit board itself has high power consumption, or when a plurality of expansion circuit boards are arranged in a personal computer, total power consumption may exceed a power which can be supplied by an expansion unit. This may cause the erroneous operation or breakdown of the personal computer.

SUMMARY OF THE INVENTION

The present invention has been made in consideration of the above circumstances, and has as its object to provide an expansion unit cable of supplying a power to a computer and improving function expansibility such that power supply to the computer is stopped depending on power consumption of the expansion unit so as to preferentially consume a power in the expansion unit.

Another object of the present invention is to provide an expansion unit capable of supplying a power to a computer and increasing the operation reliability of the expansion unit by ON/OFF-operating power supply to the computer in accordance with power consumption of an expansion board to be mounted in the expansion unit.

In order to achieve the above objects, according to the present invention, there is provided an expansion unit (1), detachably connected to the computer main body (2), for supplying a power to the computer main body (2) and expanding a function of the computer, the expansion unit (1) including:

expansion connector means (295) to which at least one expansion board (13) is arbitrarily detachably connected;

power supply means (15) for supplying the power to circuit components including the expansion circuit boards (13) and to the computer main body (2); and switching means (11, 12) for detecting the power supplied from the power supply means (15) to the circuit components and stopping power supply to the computer main body (2) by the power supply means (15) when the power exceeds a predetermined value.

With the above arrangement, when power consumption of the expansion unit is high, power supply to the computer main body is stopped. Therefore, the power supply means can supply a power to circuits of the expansion unit with a certain margin, and a normal operation of the expansion unit can be assured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of an expansion unit according to the first embodiment of the present invention;

FIG. 2 is a perspective view showing a state wherein an expansion unit and a personal computer according to the first embodiment of the present invention are connected to each other;

FIG. 3 is a perspective view showing a personal computer according to the second embodiment of the present invention;

FIG. 6B is a block diagram showing a circuit arrangement of the expansion unit according to the second embodiment of the present invention;

DETAILED DESCRIPTION OF THE PREFERRED EMBODIMENTS

First Embodiment

Figure 4:
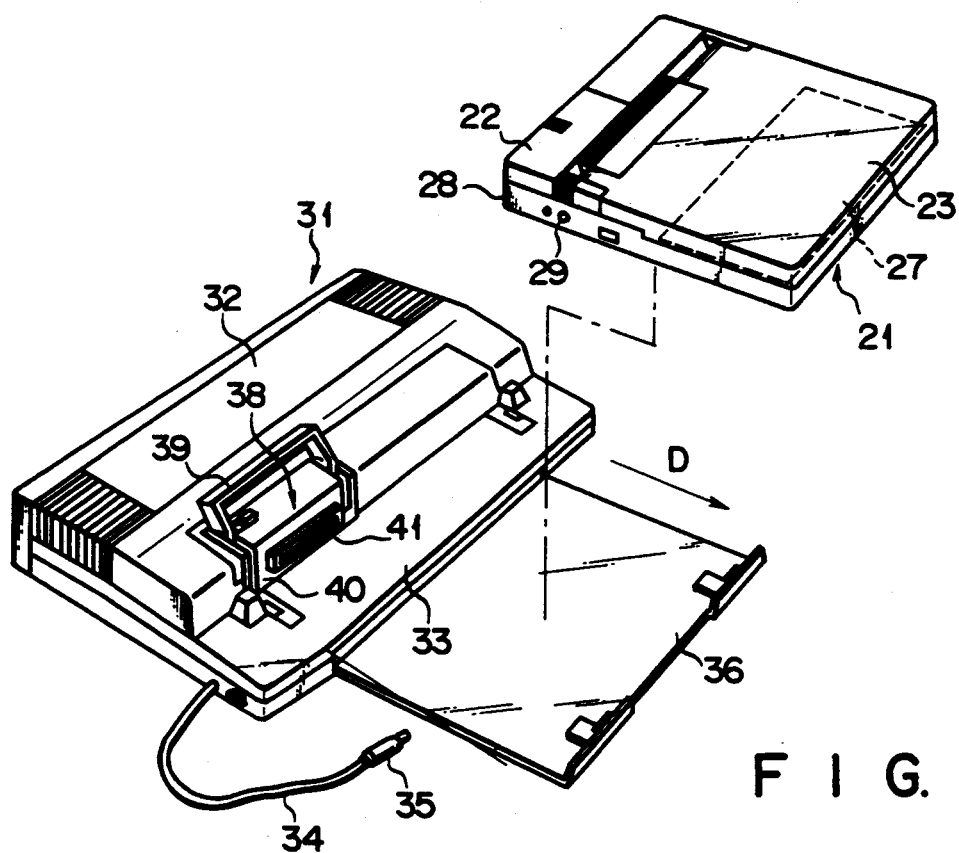
FIG. 4 is a perspective view showing a connecting method of an expansion unit and a personal computer according to the second embodiment of the present invention.
Figure 5:
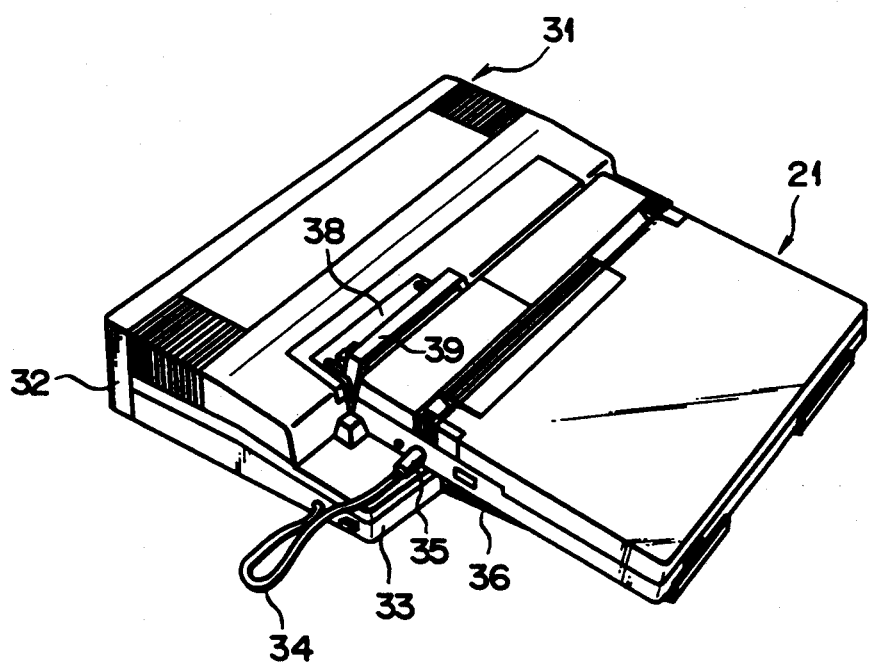
FIG. 5 is a perspective view showing a state wherein the expansion unit and the personal computer according to the second embodiment of the present invention are connected to each other.

In FIGS. 1 and 2, reference numeral 1 denotes an expansion unit, and reference numeral 2 denotes a personal computer. Reference numerals 11 to 15 denote elements or components arranged in the expansion unit 1. The reference numeral 11 denotes a current detection circuit, and the current detection circuit 11 detects power consumption of expansion cards or boards 13, i.e., the value of a current flowing through circuits of the expansion boards 13. The reference numeral 12 denotes a switching circuit turned on/off in accordance with the detection result obtained by the current detection circuit 11. The three expansion boards 13 are connected to the expansion unit 2. The reference numeral 14 denotes a display circuit for informing a user of the ON or OFF state of the switching circuit 12. An LED, a buzzer, or the like is used as the display circuit. This information may be performed by displaying a message on a display connected to the personal computer 2. The reference numeral 15 denotes a power supply circuit arranged in the expansion unit 1, and the power supply circuit 15 supplies a charge power and an operation power to not only the expansion boards 13 inserted into the expansion unit 1 and circuit parts but to the personal computer 2.

FIG. 2 shows a state wherein the personal computer 2 is connected to the expansion unit 1. The expansion boards 13 are inserted into the expansion unit 1 from a direction of an arrow A in FIG. 2.

The operation of the embodiment will be described below.

The power supply circuit 15 supplies a power to the personal computer 2 and the expansion boards 13 connected to the expansion unit 1. The power detection circuit 11 is arranged between the power supply circuit 15 and the expansion boards 13. The current detection circuit 11 detects an overcurrent state of power consumption. The switch 12 is arranged between the power supply circuit 15 and the external power supply input portion of the personal computer 2. The switch 12 is turned off when the current detection circuit 11 detects a predetermined value or more, and the switch 12 is turned on when the current detection circuit 11 detects the predetermined value or less.

The ON or OFF state of the switch 12 is informed to a user by the display means 14. The user makes a countermeasure by this information such that an AC adapter is connected to a personal computer driven by a battery before the battery is dead.

With the above description, the present invention is described using a case wherein a power is supplied from an expansion unit to a personal computer. However, the present invention is not limited to the above description, and the present invention can be applied to any machine in which a power is supplied from one power supply to two or more devices.

According to this embodiment, when an expansion board itself has high power consumption or when a plurality of expansion boards are used, a user can use an expansion unit regardless of the magnitude of the power consumption. Even if power supply to a personal computer is interrupted, a user can made some countermeasure by a function of informing this interruption. For example, since a laptop personal computer connected to an expansion unit is generally driven by a battery, temporary interruption of power supply causes no problem. Therefore, the following countermeasure is made. That is, an AC adapter (external power supply) is connected to the personal computer while the personal computer is driven by the battery.

Second Embodiment

The second embodiment of the present invention will be described in detail with reference to FIGS. 3 to 7.

FIG. 4 shows an expansion unit according to the second embodiment of the present invention and a personal computer 21 serving as a compact electronic equipment in which the expansion unit is mounted. A computer 1 is called a note-type or book-type personal computer. The computer 21 includes a battery pack 22 detachably connected to rear portion of a main body 28 and a flat panel display device 23. The display device 23 can be pivoted about a pivotal support portion 25 to stand upright.

The computer 21 includes a keyboard 27 arranged at the front portion of the main body 28. A connector 26 is arranged on the rear surface of the main body 28. The connector 26 has a large number of parallel terminals. A power supply socket 29 commonly used for a feeder plug 35 of an expansion unit 31 (to be described later) and a feeder plug of an AC adapter (external DC power supply) 43 is arranged on a side surface of the computer 21. These feeder plugs are inserted and connected to the power supply socket 29.

The expansion unit 31 will be described below.

The expansion unit 31 includes a casing 32. A power supply code 34, a distal end of which has a feeder plug 35 inserted and connected to the power supply socket 29 of the computer 21, is drawn from one side surface of the casing 32. The front portion of the casing 32 is formed as a support table portion 33 on which the rear portion of the computer 21 is mounted. A support plate 36 which can slide forward from the casing to the front portion of the casing along a direction of an arrow D in FIG. 4 is arranged on the bottom of the casing 32.

A connector unit 38 is arranged on the casing 32 at a position opposite to the connector 26 of the computer 21 mounted on the support table portion 33.

The connector unit 38 includes a handle 39 and a slider 40 moved to be interlocked with the handle 39 upon its pivotal movement. The slider 40 supports an insertion connector 41 having a guide pin and a plurality of terminals. The connector 41 is formed to be inserted and connected to the connector 26 of the computer 21. The connector 41 is arranged in a floating state by a spring with respect to the slider 40.

A procedure of connecting the computer 21 to the expansion unit 31 will be described below.

First, the support plate 36 is drawn forward from the casing 32. The rear portion of the computer 21 is mounted on the support table portion 33 of the casing 32, and the front portion of the computer 21 is mounted on the support plate 36.

In this state, when the handle 39 is pivoted moved forward, the slider 40 is pushed out forward accordingly, and the connector 41 is pushed out together with the slider 40. Immediately before the connector 41 is brought into contact with the connector 26, the distal ends of the guide pins are inserted into through holes of the connector 26, and the connector 41 is accurately positioned with respect to the connector 26.

When the slider 40 is further moved forward, the connector 41 is fitted in the connector 26. As a result, a signal can be transmitted/received between the computer 21 and the expansion unit 31.

Figure 6A:
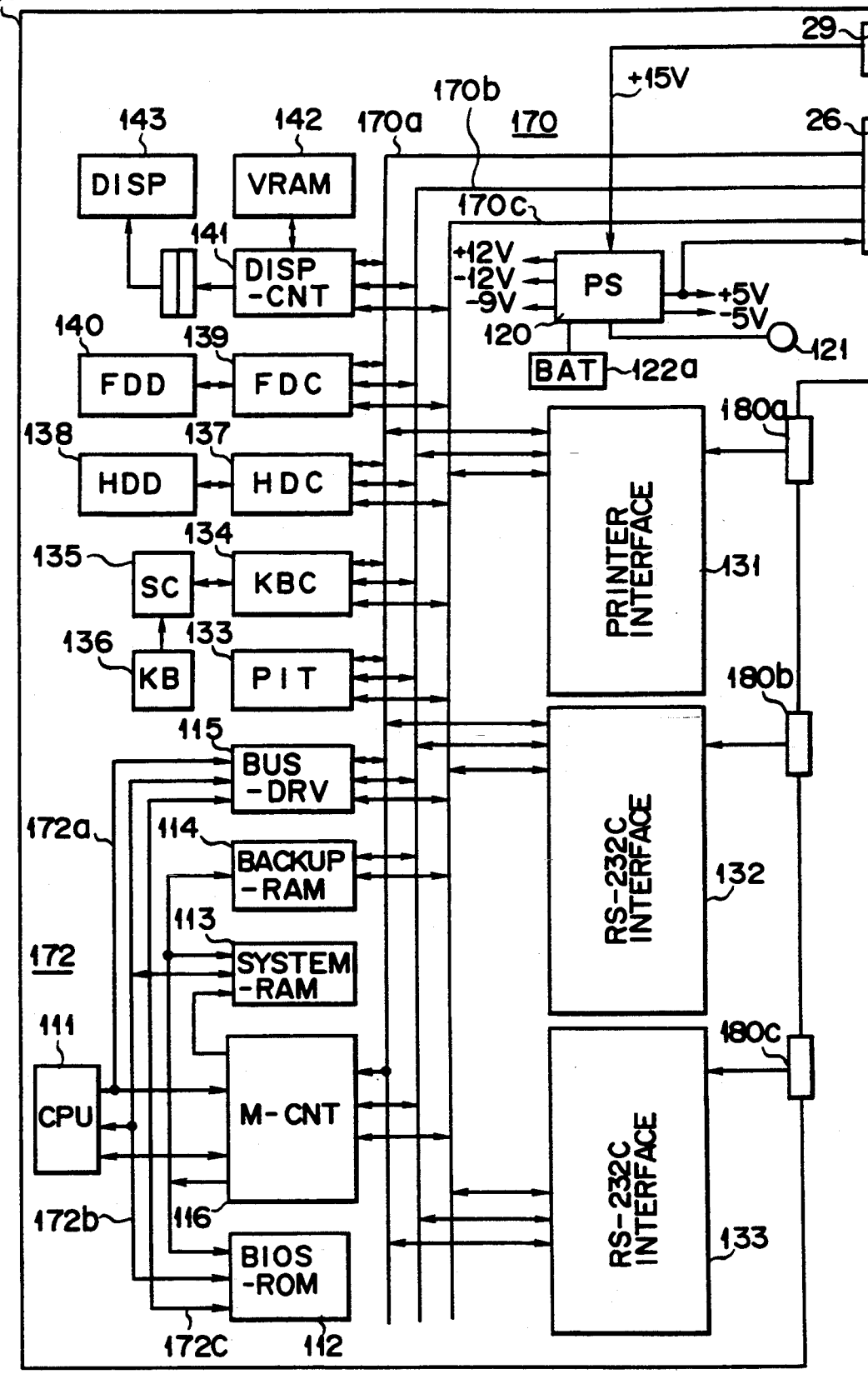
FIG. 6A is a block diagram showing a circuit arrangement of the personal computer according to the second embodiment of the present invention.

Circuit arrangements of the expansion unit 31 and the personal computer 21 will be described below with reference to FIGS. 6A to 7.

In the computer main body 21, the respective components are directly or indirectly connected to each other through a system bus 170 (a control bus 170a, a date bus 170b, and an address bus 170c). The system bus 170 is connected to the connector 26.

The CPU 111 controls the overall operation of this system. A BIOS (basis input/output system)-ROM (read only memory) 112 stores programs and the like for controlling I/O (input/output) devices. When the expansion unit 31 is connected to this computer main body 21, the I/O interface of the expansion unit 31 is used in place of the I/O interface of the computer main body 21. A system RAM (random access memory) 113 stores programs and data to be processed. A backup RAM 114 stores data and the like when resume processing is performed. While the system power supply is turned off, power is supplied to the backup RAM 114 in order to back up stored data. A bus driver (BUS-DRV) 115 is arranged between a CPU bus 172 (a control bus 172a, a data bus 172b, and an address bus 172c) and the system bus 170 so as to perform data transmission/reception therebetween. A memory controller (M-CNT) 116 performs access control with respect to the ROM 112 and the RAMs 113 and 114 under the control of the CPU 111.

A power supply (PS) 120 applies DC operating voltage (+12 V, −12 V, −9 V, +5 V, and −5 V) to the respective components by using a DC voltage (+15 v) from a AC adapter 43 (FIG. 6B) or the expansion unit 31 connecter to a power supply connecter 29. In addition, a voltage (+5 V) from the power supply 120 is applied as an operation check signal to the expansion unit 31 through the connector 26, 41.

That is, if the expansion unit 31 is not connected to the computer main body 21, the power supply connector 29 is connected to the AC adapter 43, and a DC output voltage (+15 V) from the AC adapter 43 is applied to the power supply 120. If the expansion unit 31 is connected, the power supply connector 29 is connected to a power supply connector 35 of the expansion unit 31, and DC power (+15 V) is supplied from the power supply 252 to the power supply 120. A switch 121 is used to turn on and off the power supply 120.

A secondary Battery (BAT) 122 can be detached and serves to supply power to the power supply 120. Therefore, when no power is supplied from an external circuit, the power supply 120 can supply an operating power to the internal components for a certain period. In addition, when a power is supplied from an external circuit, the power supply 120 charges the secondary battery 122.

A printer interface 131 is arranged between the system bus 170 and a printer connector 180a so as to transmit/receive data to/from a device such as a printer connected to the printer connector 180a. A first RS-232C interface 132 is arranged between the system bus 170 and RS-232C connector 180b so as to transmit/receive data and the like to/from a device connected to the RS-232C connector 180b. A second RS-232C interface 133 is arranged between the system bus 170 and the RS-232C connector 180c so as to transmit/receive data and the like to/from a device connected to the RS-323C connector 180c.

In addition, the computer main body 21 includes a programmable interval timer (PIT) 133 which can be set by a program, a keyboard controller (KBC) 134, a scan controller (SC) 135, a keyboard (KBC) 136, a hard disk controller (HDC) 137, a hard disk drive (HDD) 138, a floppy disk controller (FDC) 139, a floppy disk drive (FDD) 140, a display controller (DISP-CNT) 141, a video RAM (VRAM) 142 capable of data backup during a power-OFF period, and a display unit (DISP) 143 constituted by a plasma display or the like.

In the expansion unit 31 shown in FIG. 6B, the respective components are directly or indirectly connected to each other through a system bus 290 (a control bus 290a, a data bus 290b, and an address bus 290c). Note that the system bus 290 is connected to the system bus 170 of the computer main body 21.

The system bus 290 is connected to an expansion bus connector 295, and an expansion board 204 is selectively connected to the expansion bus connector 295 as needed. The respective components of the expansion unit 31 will be described below.

Upon reception of an operation check signal (+5 V) from the power supply 120 of the computer main body 21, a voltage detector (DET) 251 outputs a power supply enable signal to the power supply (PS) 252.

Figure 7:
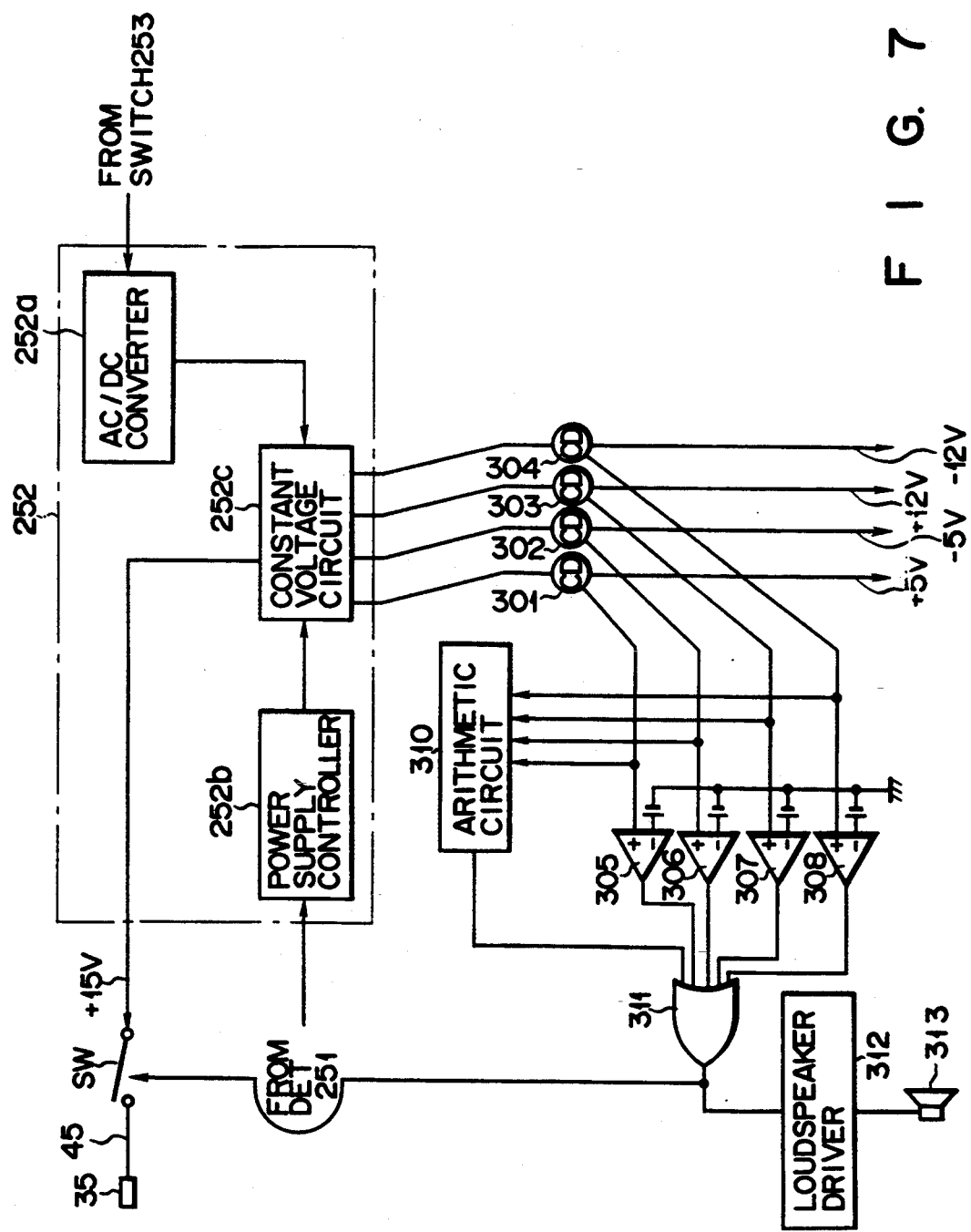
FIG. 7 is a circuit diagram showing an arrangement of a power supply circuit and a switch controller shown in FIG. 6B.

The power supply 252 comprises an AC/DC converter 252a, a power supply controller 252b, and a constant voltage circuit 252c, as shown in FIG. 7.

The AC/DC converter 252a rectifies/smoothes a commercial AC voltage from the power supply adapter and generates a DC voltage (+15 V, +12 V, −12 V, +5 V, and −5 V).

The constant voltage circuit 252c supplies DC operating voltages (+12 V, −12 V, +5 V, and −5 V) from the AC/DC converter 252a to the respective components of the expansion unit 31, and supplies a DC voltage (+15 V) to the power supply 120 of the computer main body 21.

The power supply controller 252b controls supply of DC voltages from the constant voltage circuit 252c. More specifically, no DC operating voltages (+12 V, −12 V, +5 V, and −5 V) are supplied to the respective components of the expansion unit 31 until a power supply enable signal from the voltage detector (DET) 251 is received.

A switch 253 shown in FIG. 6B is used to turn on and off the power supply 252 of the expansion unit 31.

An ID register (ID-REG) 254 is connected to the system bus 290 of the expansion unit 31 so as to store unit ID data inherent in the expansion unit 31. A port address assigned to the I/O port of each I/O interface of the expansion unit 31 can be recognized by referring to this unit ID data.

An address decoder (DEC) 255 performs address detection with respect to the ID register 254.

A printer interface 261 is arranged between the system bus 290 and a printer connector 285a so as to transmit/receive data and the like to/from a device such as a printer connected to the printer connector 285a.

A first RS-232C interface 262 is arranged between the system bus 290 and an RS-232C connector 285b so as to transmit/receive data and the like to/from a device connected to the RS-232C connector 285b. In addition, a second RS-232C interface 263 is arranged between the system bus 290 and an RS-232C connector 285c so as to transmit/receive data and the like to/from a device connected to the RS-232C connector 285c.

As a characteristic feature of this embodiment, an arrangement for stopping power supply from the expansion unit 31 to the computer main body 21 will be described below. As shown in FIG. 6B, voltages (+5 V, +12 V, −5 V, and −12 V) are supplied from the power supply 252 to the expansion board 204 as operating voltages. The current values of the voltages are measured by a switch control circuit 300. The switch control circuit 300 supplies a control signal to a switch SW to open the switch SW when the power consumption of the expansion unit 31 exceeds a predetermined value, and stops power supply from the expansion unit 31 to the computer main body 21. The control signal output from the switch control circuit 300 is also supplied to a loudspeaker driver 321. A loudspeaker 313 is driven by the loudspeaker driver 321 in response to the control signal so as to generate an alarm.

The arrangement of the switch control circuit 300 will be described in detail with reference to FIG. 7. The current values of voltages (+5 V, +12 V, −5 V, and −12 V) output from the constant voltage circuit 252c are measured by ammeters 301 to 304. The measured current values are supplied to the positive input terminals of corresponding comparators 305 to 309. Signals having predetermined reference current values Ir1 to Ir4 are supplied to the negative input terminals of the comparators 305 to 309, respectively. When the measured current values exceed the predetermined reference values Ir1 to Ir4, respectively, the outputs from the corresponding comparators 305 to 309 go to high level. The reference current values Ir1 to It4 are independently and appropriately determined in accordance with the capacity of the power supply 252.

The measurement values of the ammeters 301 to 304 are supplied to an arithmetic circuit 310. The arithmetic circuit 310 calculates power consumption of each voltage from the measurement values of the ammeters 301 to 304 and the current values corresponding to the measurement values, and compares a sum of the obtained power consumption of the voltages with a predetermined set value. The arithmetic circuit 310 outputs a high-level signal when the sum of power consumption is larger than the set value.

Outputs from the comparators 305 to 309 and the arithmetic circuit 310 are supplied to an OR circuit 311. An output from the OR circuit 311 is supplied to a control terminal of the switch Sw, and the switch SW is opened when the output from the OR circuit 311 goes to high level. For this reason, a power of +15 V supplied from the power supply 252 to the power supply 120 is forcibly interrupted. However, the power supply 120 can be operated by a power supplied from the secondary battery 122. When a user connects the AC adapter 43 to the power supply connector 29 in response to an alarm generated from a loudspeaker 313, the computer main body 21 can be operated by an external power supply.

The operation of this system after an expansion unit 31 is connected to the computer main body 21 will be described below.

After the connection between the connector 26 and the connector 45 and the connection between the feeder plug 35 and the connector 29 are completed, when the switch 253 of the expansion unit 31 is turned on while the switch 21 is set in an OFF state, the power supply 252 supplies a voltage (+15 V) to the computer main body 21 through the switch SW, a cable 34, the feeder plug 35, and the connector 29. In this case, operating voltages (+12 V, −12 V, +5 V, and −5 V) are not supplied to the respective components.

when the switch 121 is turned on, the power supply 120 of the computer main body 21 supplies operating voltages (+12 V, −12 V, −9 V, +5 V, and −5 V) to the respective components of the computer main body 21 on the basis of the voltage (+15 V) from the power supply 120. A voltage (+5 V) from the power supply 120 is supplied to the expansion unit 31 through the connectors 26 and 45.

When a voltage (+5 V) is detected in the voltage detector 251 of the expansion unit 31, an operation confirming signal is supplied to the power supply 252. In the power supply controller 252b of the power supply 252, it is determined by this operation confirming signal that the computer main body 21 is set in an operation enable state. An operating voltage is supplied to the respective components of the expansion unit 31 and the expansion board 204.

According to the above operation, power supply control at a system starting operation is completed, and the operations of the respective components are started.

In an operating state of the system, for example, it is assumed that consumption of a power having a voltage of +5 V is sharply increased due to high power consumption of one of the expansion boards 204. In this case, an output from the comparator 301 goes to high level, and an output from OR gate 311 goes to high level, thereby opening the switch SW. For this reason, the power of +15 V supplied to the computer main body 21 is interrupted. Therefore, the constant voltage circuit 252c can supply a power of +15 V with a relatively large margin. In addition, since the loudspeaker 313 generates an alarm, a user can make a countermeasure, e.g., an AC adapter 43 is connected to the power supply terminal 29.

In the operating state of the system, for example, it is assumed that total power consumption is increased. In this case, an output from the arithmetic circuit 310 goes to high level, and an output from the OR gate 311 goes to high level, thereby opening the switch SW. For this reason, a power of +15 V supplied to the computer main body 21 is interrupted, and the loudspeaker 313 generates an alarm.

As described above, according to the present invention, when a consumption amount of a power having a specific voltage value is increased, or when total power consumption is increased, power supply to the computer main body 21 is stopped. Therefore, the power supply to the components and the expansion board 24 in the expansion unit 31 can be stably performed with a relatively large margin.

Figure 8:
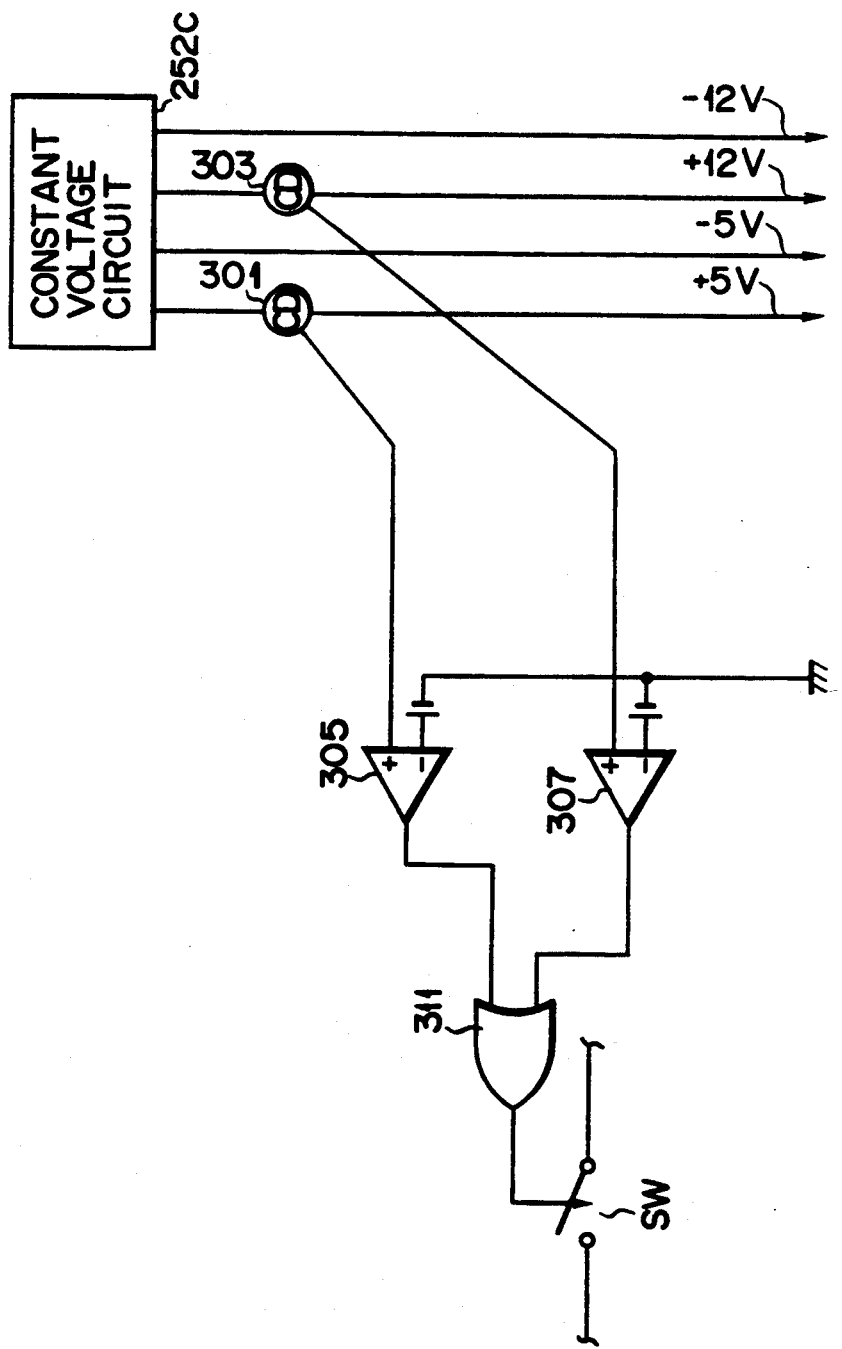
FIGS. 8, 9 and 10 are circuit diagrams showing other switch controllers.

The present invention is not limited to the above embodiment. For example, in the above embodiment, the currents of the outputs (+5 V, +12 V, −5 V, and −12 V) from the constant voltage circuit 252c are measured. However, only the outputs having positive voltages generally have large current values. Therefore, for example, the control circuit 300 may be constituted such that the ammeters 302 and 304, the comparators 306 and 308, and the arithmetic circuit 310 may be omitted except for the ammeters 301 and 303 and the comparators 305 and 307, as shown in FIG. 8.

Figure 9:
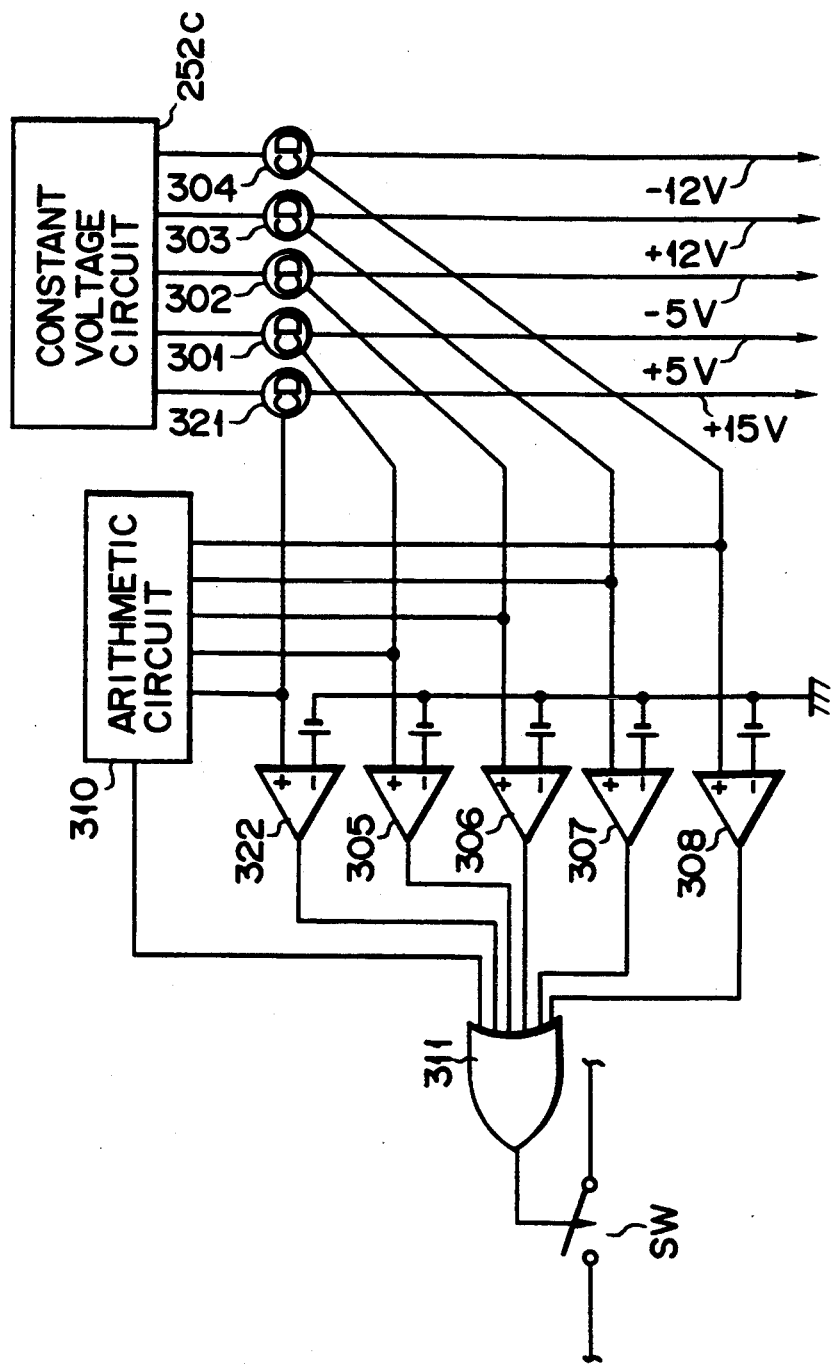

As shown in FIG. 9, the current value of the power of +15 V supplied to the computer main body 21 is measured by an ammeter 321, and the resultant value may be supplied to the comparator 322 and the arithmetic circuit 310. In this case, when an output power from the power supply 252 exceeds the capacity of the power supply 252, power supply to the computer main body 21 can be stopped.

Figure 10:
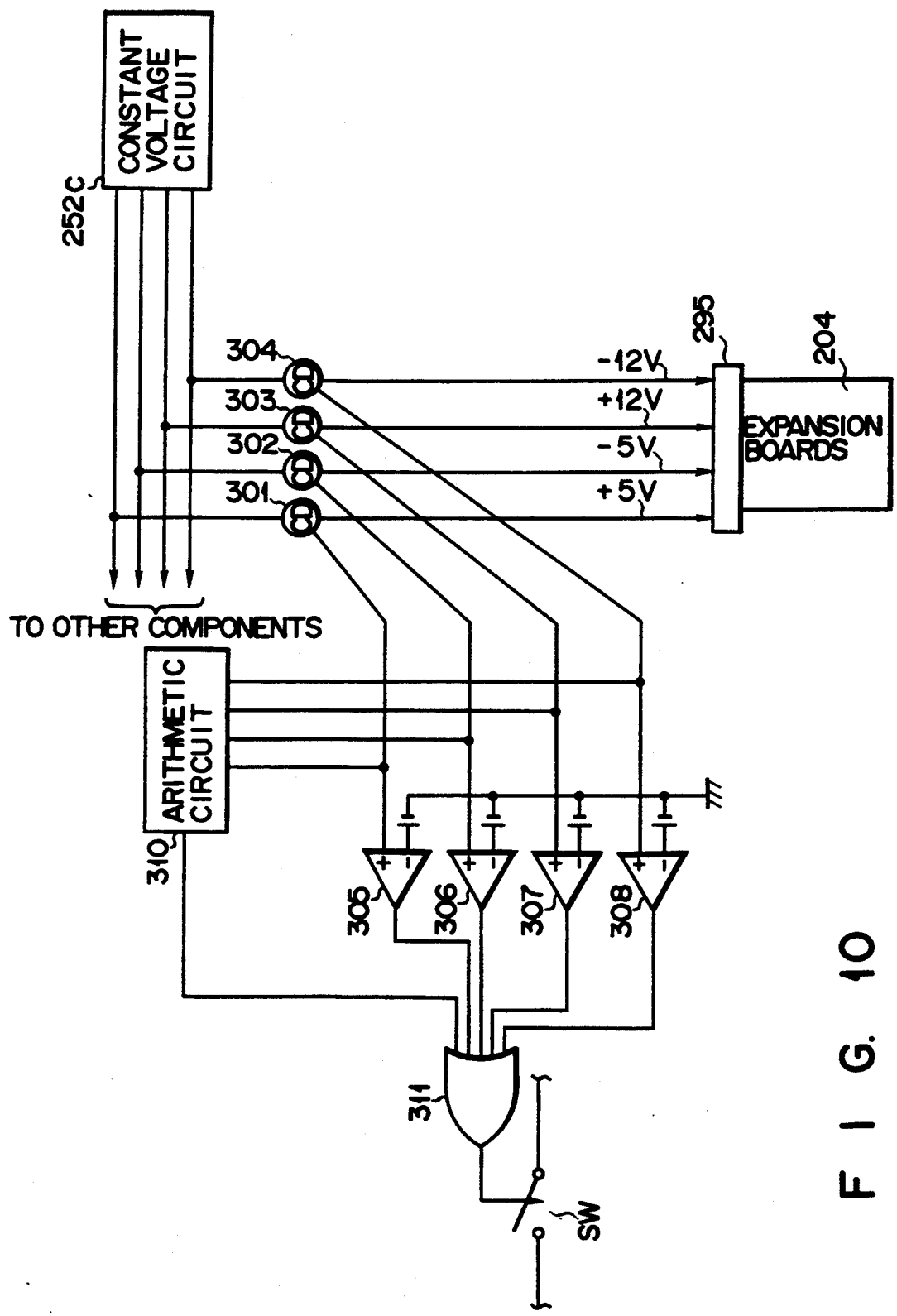

As shown in FIG. 10, the switch SW may be ON/OFF-controlled so as to check only the power consumption of the expansion board 204 which is the most decisive cause of a change in power consumption of the expansion unit 31.

For example, a wattmeter may be arranged in place of an ammeter, and a power of each voltage may be measured. The switch SW may be ON/OFF-controlled so as to compare the powers with a reference value.

The switch SW may be constituted by, e.g., a relay switch, a transistor switch, a MOSFET, or the like.

According to this embodiment, in an expansion unit for supplying a power to a computer main body, when power consumption of the expansion unit (including an expansion board) is increased, power supply to the computer main body is stopped. Therefore, powers can be stably supplied to the expansion board and components in the expansion unit.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An electronic equipment to which an external equipment is detachably connected through a power connector, said electronic equipment including internal circuit components, comprising:
   power supply means, coupled to the power connector and the internal circuit components, for supplying an external power to said external equipment through the power connector and supplying an internal power to said internal circuit components; and
   switching means, coupled to said power supply means, for detecting whether an amount of the internal power supplied from said power supply means exceeds a predetermined value and preventing the external power from being supplied to said external equipment when the amount of the internal power exceeds said predetermined value, thereby enabling said power supply means to supply the internal power for a normal operation of said internal circuit components.

2. An equipment according to claim 1, further comprising means, coupled to said switching means, for informing a user of said external equipment that the external power is not supplied to said external equipment while said switching means prevents the external power from being supplied to said external equipment.

3. An equipment according to claim 1, wherein said switching means includes:
   current value measuring means, coupled to said power supply means, for measuring a current value of the external power;
   comparing means for receiving a measurement value from said current value measuring means, comparing the measurement value with a predetermined reference value, and outputting an indicating signal indicating whether the measurement value is greater than the predetermined reference value; and
   a switch which is arranged in series between said power supply means and said power connector, receives the indicating signal from said comparing means and opens when the indicating signal indicates that the measurement value is greater than the predetermined reference value.

4. An equipment according to claim 3, wherein said power supply means outputs a plurality of currents having different voltage values, said current value measuring means independently measures values of the plurality of currents, said comparing means compares measurement values obtained by independently measuring the plurality of currents with a predetermined reference value for each current and instructs said switch to be opened when a value of at least one current is larger than the predetermined reference value.

5. An equipment according to claim 1, wherein said external equipment comprises a portable computer and said electronic equipment comprises an expansion unit for expanding a function of said portable computer.

6. An electronic equipment to which an external equipment is detachably connected through a power connector, comprising:
   an internal circuit component variably consuming power;
   power supply means, coupled to the power connector and said internal circuit component, for supplying an external power to said external equipment through the power connector and supplying an internal power to said internal circuit component;
   means, coupled to said power supply means, for detecting that an amount of the internal power supplied from said power supply means exceeds a predetermined value; and
   means, coupled to said detecting means, for preventing the external power from being supplied to said external equipment while said detecting means detects that the amount exceeds the predetermined value, thereby enabling said power supply means to supply the internal power for a normal operation of said internal circuit component.

7. An equipment according to claim 6, further comprising means, coupled to said preventing means, for informing a user of said external equipment that the external power is not supplied to said external equipment while said preventing means prevents the external power from being supplied to said external equipment.

8. An equipment according to claim 6, wherein said detecting means includes:
   current value measuring means, coupled to said power supply means, for measuring a current value of the external power; and
   comparing means for receiving a measurement value from said current value measuring means and comparing the measurement value with a predetermined reference value.

9. An equipment according to claim 6, wherein said external equipment comprises a portable computer and said electronic equipment comprises an expansion unit for expanding a function of said portable computer.

10. An electronic equipment to which an external equipment is detachably connected through a power connector and to which a circuit board is detachably connected through an expansion connector, the circuit board including an internal circuit component variably consuming power, comprising:

power supply means, coupled to the power connector and the circuit board, for supplying an external power to said external equipment through the power connector and supplying an internal power to said internal circuit component through the expansion connector;

means, coupled to said power supply means, for detecting whether an amount of the internal power supplied from said power supply means exceeds a predetermined value; and means, coupled to said detecting means, for preventing the external power from being supplied to said external equipment while said detecting means detects that the amount of internal power supplied from said power supply means exceeds the predetermined value, thereby enabling said power supply means to supply the internal power for a normal operation of said internal circuit component.

11. An equipment according to claim 10, further comprising means, coupled to said preventing means, for informing a user of said external equipment that the external power is not supplied to said external equipment while said preventing means prevents the external power from being supplied to said external equipment.

12. An equipment according to claim 10, wherein said detecting means includes:

current value measuring means, coupled to said power supply means, for measuring a current value of the external power; and comparing means for receiving a measurement value from said current value measuring means and comparing the measurement value with a predetermined reference value.

13. An equipment according to claim 10, wherein said external equipment comprises a portable computer and said circuit board comprises an expansion unit for expanding a function of said portable computer.

14. In an electronic equipment in which an external equipment is detachably connected through a power connector, and a power supply circuit supplies an external power to said external equipment through the power connector and supplies an internal power to an internal circuit component variably consuming the internal power, a method of ensuring a normal operation of the internal circuit component, comprising the steps of:

measuring a current value of the internal power supplied from said power supply circuit to said internal circuit component;

comparing the measured current value with a predetermined reference value; and preventing the external power from being supplied to said external equipment when the measured current value exceeds the predetermined reference value.

15. A method according to claim 14, further comprising the step of informing a user of said external equipment that the external power is not supplied to said external equipment while the external power is prevented from being supplied to said external equipment.

16. In an electronic equipment in which an external equipment is detachably connected to a power supply circuit through a power connector and a circuit board, including an internal circuit component which variably consumes power supplied to said internal circuit component, is detachably connected through an expansion connector to said power supply circuit, said power supply circuit supplying an external power to said external equipment through the power connector and supplying an internal power to said internal circuit component through the expansion connector, a method of ensuring a normal operation of the internal circuit component, comprising the steps of:

measuring a current value of the internal power supplied from said power supply circuit;

comparing the measured current value with a predetermined reference value; and preventing the external power from being supplied to said external equipment through said power connector while the amount of the measured current value exceeds the predetermined reference value.

17. A method according to claim 16, further comprising the step of informing a user of said external equipment that the external power is not supplied to said external equipment when the external power is prevented from being supplied to said external equipment.

18. An expansion unit for expanding a function of a portable computer removably connected to the expansion unit, comprising:

an expansion component having an internal circuit component;

a power supply circuit supplying a first power to the portable computer and a second power to the internal circuit component;

a detector which detects the second power supplied from the power supply circuit; and a controller which prevents supply of the first power to the portable computer when the detector detects that the second power exceeds a predetermined value.

19. An expansion unit according to claim 18, wherein the controller outputs an alarm signal for informing that the first power is not supplied to the portable computer when the controller prevents supply of the first power to the portable computer.

20. An expansion unit according to claim 19, further comprising a speaker driven in response to the alarm signal.

* * * * *